United States Patent [19]

Kobes et al.

[11] Patent Number: 4,950,493

[45] Date of Patent: Aug. 21, 1990

[54] PROCESS FOR MAKING ENZYME INACTIVATED VISCOUS FRUIT PULP AND PRODUCTS THEREFROM

[75] Inventors: Gerald W. Kobes; Thomas A. Eisele, both of Selah, Wash.

[73] Assignee: Tree Top, Inc., Selah, Wash.

[21] Appl. No.: 437,290

[22] Filed: Nov. 16, 1989

Related U.S. Application Data

[63] Continuation of Ser. No. 935,291, Nov. 26, 1986, abandoned.

[51] Int. Cl.$^5$ .............................................. A23L 1/212
[52] U.S. Cl. .................................... 426/399; 426/484; 426/516; 426/615; 99/565
[58] Field of Search ............... 426/615, 399, 484, 516, 426/599

[56] References Cited

U.S. PATENT DOCUMENTS

| | | | |
|---|---|---|---|
| 805,369 | 11/1905 | Marshall . | |
| 1,197,442 | 9/1916 | Burke | 426/615 |
| 2,083,837 | 6/1937 | Goecke . | |
| 2,182,829 | 12/1939 | Thomas | 426/615 |
| 2,302,169 | 11/1942 | Baker . | |
| 3,019,113 | 1/1962 | Rooker | 426/399 |
| 3,272,649 | 9/1966 | Huser . | |
| 3,366,489 | 1/1968 | Wagner et al. | 426/599 |
| 3,762,947 | 10/1973 | Ornstein et al. . | |
| 3,788,392 | 1/1974 | Abbott et al. . | |
| 3,818,821 | 6/1974 | Kendall, Jr. . | |
| 3,829,931 | 8/1974 | Suerhaum . | |
| 3,892,877 | 7/1975 | Wagner et al. | 426/599 |
| 4,266,472 | 5/1981 | Reale | 426/615 |
| 4,361,083 | 11/1982 | Natusch . | |
| 4,370,945 | 2/1983 | Beckschulte et al. . | |
| 4,482,253 | 11/1984 | Golobie et al. . | |

OTHER PUBLICATIONS

Beale, 1972 Mixer and Blender Cookery, Pitman Publishing, p. 46.
Rombauer et al, 1975, Joy of Cooking, Bobbs-Merrell Company, Inc., pp. 803 and 806.
Home and Garden Bulletin No. 125, 1968, Fruits in Family Meals, p. 11.
Family Circle Illustrated Library of Cooking, 1972, Rockville House Publishers, Inc., New York, p. 1063.
Woodroof, 1975, Commercial Fruit Processing, AVI Publishing Company, Inc., Westport, CT, pp. 155-157.

*Primary Examiner*—Carolyn Paden
*Attorney, Agent, or Firm*—Seed and Berry

[57] ABSTRACT

A method for preparing fruit sauce is disclosed wherein fruit having skins, seeds, and meat is extruded through a perforated drum to provide a small particle size pulp. The pulp is immediately heated quickly to a temperature above the inactivating temperature of the discoloring enzymes of the fruit within a time period less than is necessary for the enzymes to cause discoloration. The pulping process maximizes pectin in the pulp to give the pulp a high viscosity. Particles remain in the pulp to give the pulp a good, discernible bite or mouth feel. The volatile flavors and aromas are trapped in the pulp by heating the pulp in a closed container while causing the enzymes to be inactivated with heat.

24 Claims, 2 Drawing Sheets

PROCESS FOR MAKING ENZYME INACTIVATED VISCOUS FRUIT PULP AND PRODUCTS THEREFROM

This application is a continuation of Ser. No. 935,291, filed Nov. 26, 1986 which is now abandoned.

TECHNICAL FIELD

This application pertains to fruit processing processes, apparatus, and products.

BACKGROUND ART

Soft-meat fruit having skins and stones or seeds within cores of the meat are frequently made into purées and sauces. Apples are a typical soft-meat fruit, and applesauce is a preferred form of product made from apples. Applesauce is conventionally made by first peeling the apples to remove the skins and then coring to remove seeds by removing the core. Large pieces of apple meat are formed. These large pieces are reduced in size by chopping or cutting into smaller pieces. Next, the reduced-size pieces of the apple meat are cooked in a long cooking apparatus, perhaps 50–60 feet long, where the small pieces are raised to a temperature of about 200° F. by mixing live steam directly with the pieces of meat in the cooking apparatus.

The peeling and coring machines heretofore used frequently miscut the apples due to faulty machines or misaligning of the apples within the machines. This results in pieces of core still containing seeds and pieces of skin finding their way into the cooking apparatus. By the time the small pieces have been cooked at a temperature of 200° F. and moved through the cooking apparatus, they are in a finely comminuted, soft, low-viscosity liquid condition. The low-viscosity liquid condition results in part from the mixing of water in the form of steam directly with the meat pieces. Also, the low viscosity results from the fact that in the peeling of the apples, the meat adjacent the skin, which contains the largest amounts of pectin, is removed. Pectin is a known viscosity increaser in sauces.

The low-viscosity liquid and remaining undesirable pieces of peel and seeds are then passed through a finely perforated drum, called a "finishing drum," which allows the low-viscosity sauce to pass, but traps the seeds and skin particles. The sauce resulting from these conventional processes is of the consistency of strained baby food. It is of low viscosity and has a "mouth feel" or texture free of any sized particles.

Since the peeling and coring operation leaves relatively large pieces of meat of the fruit, these pieces must be reduced in size before they can be effectively heated thoroughly throughout. Enzymatic reactions, which cause the familiar browning of cut apples, take place within a relatively few seconds after the skin has been perforated. To prevent browning of the apple pieces in the conventional process, direct steam is injected into the apple product over a long period of time. This will inactivate the enzyme which causes browning; however, as previously mentioned, the net result is the addition of large amounts of water and a subsequent decrease in product viscosity. In addition, the open steam injection process tends to steam strip out the volatile flavor and aroma components, resulting in an inferior product. Both the decrease in viscosity and the loss of flavor and aroma components are undesirable traits for applesauce.

Other attempts have been made to "blanch" the peeled and cored meat of the fruit immediately after peeling and coring. In a "blanching" process, the apple pieces are relatively large with minimum surface area and minimum perforations to reduce enzyme-caused brown discoloration. These attempts, however, have not been successful since the pieces of fruit entering the blanching apparatus are of a size too large to get rapid enough and thorough enough heat penetration into the fruit pieces to inactivate the enzyme which causes browning. When these inadequately heat-treated large pieces are converted into smaller pieces during the saucing process, the product begins to brown in a relatively few seconds.

The sauce is treated with a sweetener or flavoring agent, is heated to a pasteurization temperature to kill bacteria, and is finally fed to a filling machine for bottling or canning the sauce.

DISCLOSURE OF THE INVENTION

It is an object of this invention to provide a process and apparatus for producing enzyme inactivated fruit pulp from fruit of the type having a soft meat covered by a skin and with stones or seeds within the meat.

It is another object of the invention to provide a sauce, particularly an applesauce, which has a higher viscosity than conventionally made applesauce, a natural color, freedom from enzyme discoloration, and a multiple-sized particle consistency with a large portion of separately discernible particles of a size larger than the majority of the particles in the sauce.

This applesauce is produced by a process which extrudes the meat of the apples through a finely perforated drum, forming a small particle pulp free from stems, seeds, and skins. Next, this pulp is immediately, almost instantaneously, heated to a temperature which inactivates the discoloration enzymes of the apples. The heating will also inactivate viscosity changing enzymes. The heat occurs within a time period which is less than the enzymes require to begin their discoloring activity.

In a preferred embodiment of the invention, the fruit is separated from its undesirable skins, seeds, and stems by squeezing the fruit between a belt and a perforated drum. Preferably, the pulp removed from the fruit is immediately pumped into a large, vertically aligned cylindrical heating tank. The pulp is pumped in from the bottom of the tank, which is maintained at a slight back pressure, while a steam-heated rotating coil moves continuously through the pulp in the tank to maintain the temperature of the pulp in the tank above the enzyme inactivation temperature.

The enzyme inactivated pulp is then treated to enhance its flavor, heated to a pasteurization temperature, and finally dispensed into cans or bottles.

Since the pulp coming from the perforated drum is of a size much smaller than cut pieces of core and meat, it can be instantaneously heated completely through to inactivate the enzymes throughout the pulp. This combination of producing a small particle size pulp and immediately being able to bring that pulp up to an enzyme-inactivating temperature within a time less than it takes for the discoloration enzymes to actively discolor the fruit results in a naturally colored pulp which retains that color throughout the process to its final canned or filled product. In addition, the extrusion technique of removing the meat from the stems, skins, and seeds results in a higher yield of usable pulp from the fruit. The pulp also comes from the area of the fruit immediately within the skin, which contains the largest amounts of pectin. The pulp all the way through the system carries this pectin and thus has a higher viscosity than other types of applesauces.

Still a further advantage is that the pulp is free of stems, skin, and seeds and thus does not need subsequent finishing or pushing through a small-size screen. This leaves the pulp throughout the process with discernible meat particles larger than the majority of the particles in the final sauce. The resulting product is a greatly enhanced sauce having particles that can be detected by the tongue and teeth, giving the sauce an ideal "mouth feel." The higher viscosity also gives the fruit a more substantive texture. This fruit has been found to be much more desirable and marketable than applesauces made from conventional techniques. Another advantage is that by inactivating the enzymes in a closed pressurized system, the desired volatile flavors and aroma components of the fruit are trapped and stay in the product.

The process is also capable of producing other types of sauces or viscous fluids that can be used in making fruit leather or other products from a large variety of fruit in addition to apples.

BEST MODE FOR CARRYING OUT THE INVENTION

Figure 1:
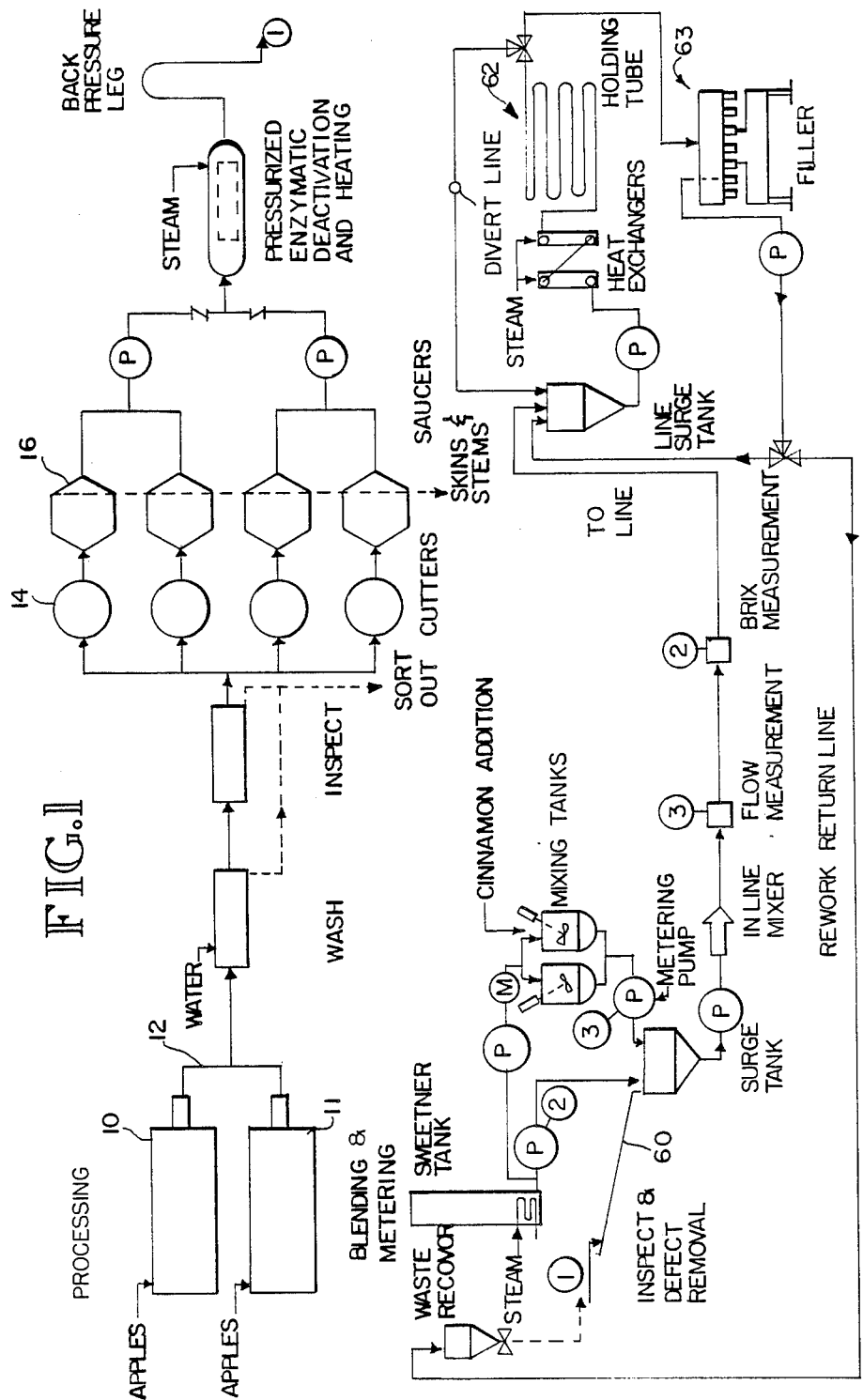
FIG. 1 is an operational schematic illustrating a preferred form of the process and apparatus.

As best shown in FIG. 1, fruit of the type having skins, and stones or seeds in a core surrounded by the skins, are collected in blending hoppers 10 and 11. These hoppers are intended to hold different fruit, for example, different sizes or varieties of apples. The process is preferably designed for making applesauce from apples and will be discussed in this context. It should be understood, however, that other products can be made from other fruits using all or portions of the process and apparatus.

The apples are distributed to a washing apparatus by metering conveyors 12. After being washed and manually inspected for defects, the apples, if large, will go to cutters 14. The cutters reduce the size of larger apples to smaller sizes. As is apparent, the fruit at this point is raw, that is, it has a cell structure that has not been ruptured by macerating or cooking. If there are smaller apples present, however, the cutters need not be used. Next, the apples go to a unique separator, which extrudes the meat of the fruit in a finely comminuted pulp separated from the skin, stems, and seeds.

Figure 2:
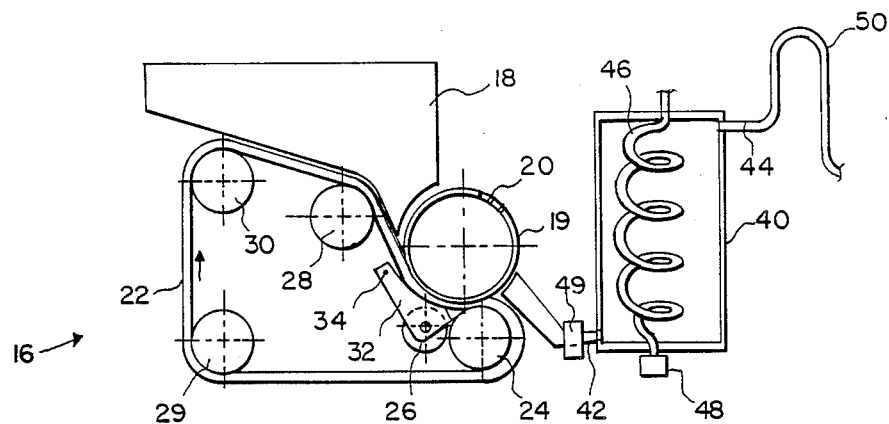
FIG. 2 is a schematic illustration of a preferred form of the apparatus for forming the pulp and heating the pulp to inactivate the discoloring enzymes.

A schematic illustration of the separating apparatus is shown in FIG. 2. An apparatus suitable for this separation is an Automatic Deboner and Desinewer, model 695, manufactured by Baader North America, Woburn, Mass. A brief description of the Baader equipment, as shown in FIG. 2, will now be provided. This equipment consists of a hopper 18 and a perforated drum 19 having perforations 20 of a size preferably 2-3 millimeters in diameter. A pressure belt 22 forms a nip adjacent the drum to squeeze the apples or pieces of apples between the belt and the perforated drum to extrude the meat of the apples through the perforations into the center of the drum. A pressure roll 24 applies the pressure on the belt to extrude the meat through the perforations in the drum. A backing roll 26 helps to form the nip to begin increasing the pressure on the apples. Guide rolls 28, 29, and 30 help to guide the solid belt. Belt-biasing levers 32 connected by a supporting arm 34 may be used to provide pressure release to the belt if desired. The apparatus described is illustrated in U.S. Pat. No. 3,829,931, the description of which is incorporated herein by reference thereto.

The stems, seeds, and skin are left on the exterior of the drum and are removed for disposal. The meat extruded through the drum is of a small particle size, but still contains particles large enough for a bite or mouth feel. Furthermore, the meat adjacent the skin is in the pulp, thus maximizing the pectin content within the pulp. The pulp also contains core material so that the total yield of the pulp from the apples is much higher than from systems using cutting, coring, and peeling machinery.

It is important that this small particle size pulp be heated to a temperature above which the discoloration enzymes in the pulp will not be activated. The heating must be done in a very short span of time so that the enzymes do not have an opportunity to begin discoloration activity. Enzymatic discoloration in cold pulp leaving the drum at a temperature of about 50° F. is relatively slow. Enzymatic discoloration in the pulp as the pulp is heated is more rapid. Therefore, while it is important to begin heating as soon as possible after removing the peel, stems, and seeds, it is most important to bring the pulp to the enzyme-inactivating temperature within three seconds after heating has commenced. To accomplish this, a heater is placed in close proximity to the discharge from the center of the drum. The heater of the preferred embodiment is a large upright cylinder 40, having a lower entrance 42 and an upper discharge 44. A helical hollow coil 46 sealed from the pulp is heated by steam within the coil. The coil is rotated by a motor 48. The coil mixes and heats the pulp without contacting the pulp directly with the steam. The heater and its components as thus far described are conventional and are typically used in tomato processing plants.

The cold pulp is delivered to the heater within a few seconds, preferably about two seconds. The cold pulp is heated in amounts that can be heated quickly. The pulp is fed into the heater by a pump 49. The heater remains sealed from the atmosphere, with a discharge pipe having a back pressure leg 50 to maintain a few psi pressure in the cylinder. This back pressure and sealed condition of the cylinder trap the volatile flavor and aroma components so that they do not escape and remain with the heated pulp to enhance the flavor of the resulting sauce. The purpose of the heater 40 is not to cook the pulp but merely to bring it quickly to a temperature which inactivates the discoloring enzymes. It is desirable to bring the cold pulp up to a temperature of between 155° F. and 190° F., preferably about 170° F., within two to three seconds. The preferred technique for doing this is to introduce a differential flow rate of no more than 15% of the volume of the cylinder with cold pulp while maintaining the balance of the cylinder filled with preheated pulp at its temperature of preferably 170° F. The introduction of only a small percentage of cold pulp enables that small percentage of cold pulp to be brought up to temperature very rapidly without overheating the pulp.

Upon leaving the back pressure leg of the cylinder, the process continues at reference numeral 1 to the final sauce-making procedures. The heated pulp is given a final inspection at station 60. The sauce then may have sugar, cinnamon, or other additives added and is finally brought to a pasteurization heating line 62. After final heating, the sauce is delivered to the filler 63 for placing in cans or other containers.

While the preferred embodiments of the invention have been illustrated and described, it should be apparent that variations will be obvious to one of skill in the art. Accordingly the invention is not to be limited to the specific embodiments illustrated in the drawing.

We claim:

1. A commercial process of making applesauce from apples having seeds embedded in a core within soft meat surrounded by a skin comprising:
    separating the skins and seeds from whole or large pieces of unpeeled apple having a cell structure that is not ruptured by cooking or macerating by pushing the apple meat, including the core, through small perforations to form pulp of finely divided meat pieces which are up to 3 millimeters in diameter and considerably smaller than the core size and free from stems, seeds, and skin;
    raising the temperature of the pulp almost instantaneously, and in less than the time necessary to cause discoloration from enzyme activity, to a discoloration enzyme-inactivating temperature, but less than final pasteurization temperature to obtain a pulp which is substantially free from enzymatic discoloration;
    cooking the pulp to final pasteurization temperature; and
    dispensing the cooked pulp into containers.

2. The process of claim 1, said step of raising the temperature of the pulp including introducing no more than about fifteen percent unheated pulp to a larger volume of pulp preheated to a temperature of between 155° F.–190° F. to bring the temperature of the unheated pulp to about 155° F.–190° F. within about two seconds.

3. The process of claim 2 wherein said temperature of the heated pulp is brought to about 170° F.

4. The process of claim 1 wherein said step of raising the temperature almost instantaneously requires no more than three seconds.

5. The process of claim 4 wherein said step of raising the temperature almost instantaneously requires no more than two seconds.

6. The process of claim 1 wherein said step of separating the skins and seeds includes squeezing the apple between a roller-supported, moving imperforate belt and a perforated drum tangentially engaged by the belt, with the apple fed into the nip between the belt and the drum.

7. The process of claim 1 wherein said step of raising the temperature to inactivate the discoloring enzymes includes heating the pulp in a container back-pressurized and sealed from the atmosphere so as to contain the volatile aroma and flavor components in the pulp.

8. The product of the process of claim 1.

9. The commercial process of making enzyme inactivated viscous fruit pulp from apples having stems, skin, and meat with a core and seeds within the core, comprising:
    extruding the meat having a cell structure that is not ruptured by cooking or macerating of the unpeeled apples through a perforated drum to separate the stems, skins, and seeds from the meat and forming a pulp containing all of the meat including the core and the meat adjacent the skin; and
    heating the pulp to a temperature sufficient to inactivate discoloration enzymes within a time less than required to cause enzymatic discoloration so as to inactivate discoloring enzymes before they can discolor the pulp to obtain a pulp which is substantially free from enzymatic discoloration.

10. The process of claim 9 wherein the pulp is heated to between 155° F. and 190° F. within about two to three seconds.

11. The process of claim 10, said step of heating the pulp including adding to the preheated pulp a differential flow rate of unheated pulp of no more than fifteen percent of the volume of the preheated pulp while mixing the cold pulp into the preheated volume of pulp.

12. The process of claim 10, said step of heating the pulp including heating the pulp to a temperature of about 170° F. within five seconds of its extrusion.

13. The process of claim 8 wherein said step of heating the pulp to inactivate discoloration enzymes includes heating the pulp in a container back-pressurized and sealed from the atmosphere so as to contain the volatile aroma and flavor components in the pulp.

14. The product of the process of claim 9.

15. A commercial method for making applesauce without coring or peeling apples, comprising:
    squeezing sliced, chopped, crushed, or whole uncored and unpeeled apples having a cell structure that is not ruptured by cooking or macerating having an edible meat portion between an impervious belt and a perforated surface to push the edible meat portion of the apple including the meat closely adjacent the skin through the perforations to form a high viscosity, large particle size apple pulp, said belt urged into contact with said perforations while residual apple skin, core, stem, and seed components remain adjacent to said belt and become separated from said apple pulp; and
    heating said apple pulp in a closed container substantially instantaneously to cooking temperature whereby endogenous enzymes that cause pulp browning and viscosity changes are inactivated, and apple flavor and aromas are retained in the applesauce to obtain an applesauce which is substantially free from enzymatic discoloration.

16. The product of the process of claim 15.

17. A commercial process of making sauced fruit products from fruit like apples having seeds embedded in a core within solid soft meat surrounded by a skin, comprising:
    separating the skins and seeds from unpeeled fruit that have a cell structure that is not ruptured by cooking or macerating without first peeling, coring and trimming by pushing the solid fruit meat, including the core, and the meat adjacent the skin through small perforations to form pulp of finely divided meat pieces which are up to 3 millimeters in diameter and considerably smaller than core size and free from stems, seeds, and skin;
    raising the temperature of the pulp almost instantaneously, and in less than the time necessary to cause discoloration from enzyme activity, to a discoloration enzyme-inactivating temperature, but less than final pasteurization temperature to obtain a pulp which is substantially free from enzymatic discoloration;

cooking the pulp to final pasteurization temperature, and dispensing the cooked pulp into containers.

18. The commercial process of making enzyme inactivated viscous fruit pulp from solid fruit having stems, skin, and meat with a solid core and seeds within the core, comprising:

extruding the meat that has a cell structure that is not ruptured by cooking or macerating of unpeeled fruit through a perforated drum without first peeling, coring and trimming the fruit to separate the stems, skins, and seeds from the meat and forming a pulp containing all the meat, including the core and the meat adjacent the skin; and heating the pulp to a temperature sufficient to inactivate discoloration enzymes within a time less than required to cause enzymatic discoloration so as to inactivate discoloring enzymes before they can discolor the pulp.

19. A commercial process of making applesauce from apples having seeds embedded in a core within soft meat surrounded by a skin comprising:

conveying the apples to a separating station;

at the separating station, separating the skins and seeds from whole or large pieces of solid unpeeled apple by pushing the solid whole or large pieces of unpeeled apple, including the core, through small perforations to form pulp of finely divided meat pieces which are up to 3 millimeters in diameter and considerably smaller than the core size and free from stems, seeds, and skin;

raising the temperature of the pulp almost instantaneously, and in less than the time necessary to cause discoloration from enzyme activity, to a discoloration enzyme-inactivating temperature, but less than final pasteurization temperature to obtain pulp which is substantially free from enzymatic discoloration;

cooking the pulp to final pasteurization temperature; and dispensing the cooked pulp into containers.

20. The commercial process of making enzyme inactivated viscous fruit pulp from solid raw apples having stems, skin, and meat with a core and seeds within the core, comprising:

first extruding the solid raw apples through a perforated drum to separate the stems, skins, and seeds from the meat and forming a pulp containing all of the meat, including the core and the meat adjacent the skin; and second, heating the pulp to a temperature sufficient to inactivate discoloration enzymes within a time less than required to cause enzymatic discoloration so as to inactivate discoloring enzymes before they can discolor the pulp.

21. A commercial method for making applesauce without coring or peeling apples; comprising:

squeezing sliced, chopped, crushed, or whole uncored and unpeeled solid apples having an edible meat portion between an impervious belt and a perforated surface to push the edible meat portion of the apple, including the meat closely adjacent the skin, through the perforations to form a high viscosity, large particle size apple pulp, said belt urged into contact with said perforations while residual apple skin, core, stem, and seed components remain adjacent to said belt and become separated from said apple pulp; and heating said apple pulp in a closed container substantially instantaneously to a cooking temperature whereby endogenous enzymes that cause pulp browning and viscosity changes are inactivated, and apple flavor and aromas are retained in the applesauce to obtain an applesauce which is substantially free from enzymatic discoloration.

22. A commercial process of making sauced fruit products from solid fruit like apples having seeds embedded in a core within solid soft meat surrounded by a skin, comprising:

separating the skins and seeds from unpeeled fruit without first peeling, coring, and trimming the fruit by pushing the solid fruit, including the core, and the meat adjacent the skin into small perforations to form pulp of finely divided meat pieces which are up to 3 millimeters in diameter and considerably smaller than core size and simultaneously removing the stems, seeds, and skin which do not pass through the perforation;

raising the temperature of the pulp almost instantaneously, and in less than the time necessary to cause discoloration from enzyme activity, to a discoloration enzyme-inactivating temperature, but less than final pasteurization temperature to obtain a pulp which is substantially free from enzymatic discoloration;

cooking the pulp to final pasteurization temperature; and dispensing the cooked pulp into containers.

23. A commercial method for making applesauce without coring or peeling apples, comprising:

squeezing sliced, chopped, crushed large pieces of unpeeled and uncored apples, or whole uncored and unpeeled apples, having an edible meat portion between an impervious belt and a perforated surface to push the edible meat portion of the apple, including the meat closely adjacent the skin, through the perforations to form a high viscosity, large particle size apple pulp, said belt urged into contact with said perforations while residual apple skin, stem, and seed components remain adjacent to said belt and become separated from said apple pulp; and heating said apple pulp in a closed container substantially instantaneously to a cooking temperature whereby endogenous enzymes that cause pulp browning and viscosity changes are inactivated, and apple flavor and aromas are retained in the applesauce to obtain an applesauce which is substantially free from enzymatic discoloration.

24. The commercial process of making enzyme inactivated viscous fruit pulp from raw solid fruit having stems, skin, and meat with a solid core and seeds within the core, comprising:

pushing the raw solid fruit through a perforated drum without first peeling, coring, and trimming the fruit to separate the stems, skins, and seeds which do not pass through the perforated drum from the meat which does pass through the drum, and forming a pulp containing all the meat, including the core and the meat adjacent the skin; and heating the pulp to a temperature sufficient to inactivate discoloration enzymes within a time less than required to cause enzymatic discoloration so as to inactivate discoloring enzymes before they can discolor the pulp.

* * * * *